April 14, 1942.    G. A. LYON    2,279,334
WHEEL STRUCTURE
Filed Nov. 25, 1940
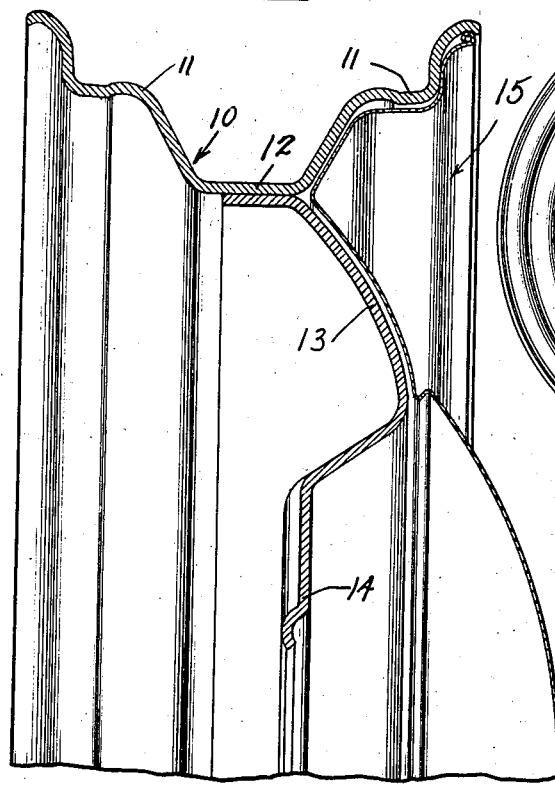
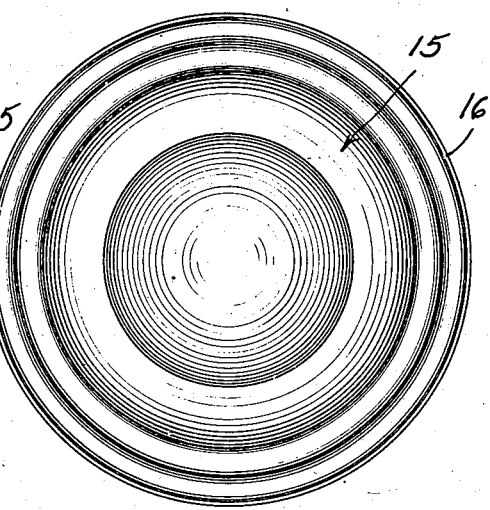
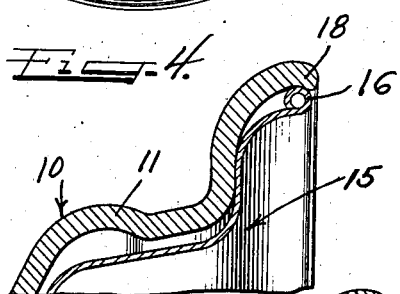
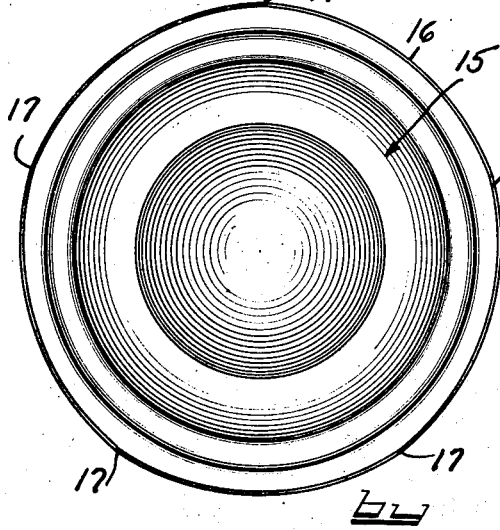
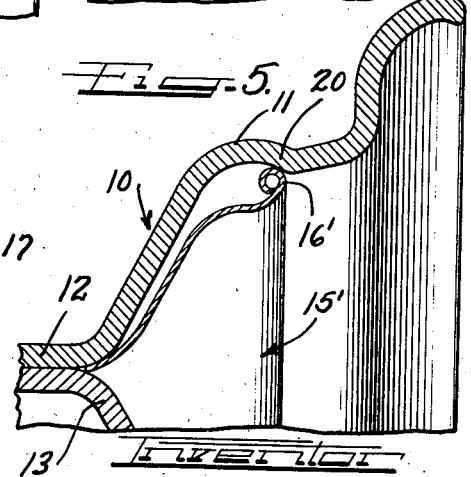
Inventor
GEORGE ALBERT LYON.

Patented Apr. 14, 1942

2,279,334

UNITED STATES PATENT OFFICE 2,279,334

WHEEL STRUCTURE

George Albert Lyon, Allenhurst, N. J.

Application November 25, 1940, Serial No. 366,971

4 Claims. (Cl. 301—37)

This invention relates to a wheel structure, and more particularly to a wheel cover member either in the form of a solid disk or an annulus having novel means for detachably retaining it on the wheel.

An object of this invention is to provide an improved construction for detachably retaining a wheel covering member on the tire rim of the wheel.

Another object of this invention is to provide a novel wheel covering member conforming intimately in shape with the shape of the portion of the wheel covered thereby and adapted to be resiliently snapped into retaining engagement with the shoulder of the tire rim.

In accordance with the general features of the invention, there is provided in a wheel structure, including a wheel having a flanged and shouldered tire rim, a circular cover member or disk formed to be resiliently snapped into retained engagement behind the shoulder of the rim and having an outer peripheral edge normally distorted out of a circular shape at a plurality of spaced portions and each portion being flexible upon engagement with the shoulder in a direction such as to flex the edge back to circular shape and to place the edge under resilient stress whereby it resiliently grips the shoulder to hold the cover member on the wheel.

Other objects and features of this invention will more fully appear from the following detailed description taken in connection with the accompanying drawing which illustrates several embodiments thereof, and in which:

Figure 1 is a side elevation of a wheel cover made in accordance with the features of this invention but prior to the distorting of the same out of a circular shape;

Figure 2 is a view similar to Figure 1 but showing the outer peripheral edge of the cover member distorted at a plurality of points so that the edge is non-circular;

Figure 3 is a fragmentary vertical cross-sectional view taken through a wheel showing the cover of Figure 2 applied thereto;

Figure 4 is an enlarged fragmentary cross-sectional view corresponding to a portion of Figure 3 and showing how the resilient edge of the cover member cooperates with a shoulder of the rim to retain the cover member on the wheel; and Figure 5 is an enlarged fragmentary cross-sectional view similar to Figure 4 showing a slightly modified form of cover member which is in the form of an annulus.

As shown on the drawing:

The reference character 10 designates generally a stepped or drop center type of tire rim including a multiple of stepped flanges 11 and a base flange 12. Secured in any suitable way to the base flange 12 is a wheel body or spider 13 which is of a bulged or convex shape and includes the usual central wheel fastening flange 14.

Cooperable with this wheel is a circular cover member 15 which is illustrated in section in Figure 3 and in elevation in Figure 2. This cover member is of a cross-sectional shape such that it closely follows the contour of the outer side of the wheel including the outer side of the rim 10 and the wheel body 13. This cover member 15 may be in the form of a solid disk as shown in Figures 2 and 3 or may be in the form of an annulus as shown in the modification of Figure 5. It is made by any suitable press equipment from sheet material such, for example, as steel sheets. I have obtained excellent results in the making of disk members from stainless steel and 18–8 steel (18 parts chromium and 8 parts nickel).

The outer edge of the cover member 15 is turned or formed into a bead 16 which is of a diameter that it may be flexed into retaining cooperation with a shoulder 18 at the outer edge of one side flange of the tire rim 10.

In order to provide for the retention of this cover member on the wheel I buckle the outer peripheral edge 16 of this cover member at a plurality of points 17 (Figure 2) so that the edge is normally distorted out of the true circular shape shown in Figure 1 to the buckled or distorted shape shown in Figure 2. It will be perceived that the distortion at the points 17 is so slight that there is no readily perceptible change in the cross sectional shape of the beaded edge 16.

As a consequence, if the edge 18 is pressed into a circular confining area of a diameter slightly less than that of the buckled edge, the buckled edge will be distorted in a direction tending to bring it back to its original circular shape. Obviously, while it is thus held in a shape more nearly approaching or equal to a circle, it will be under stress or tension. As shown in Figure 4, the outer beaded edge 16 of the cover member 15 is, when the cover member is pressed home into covering position on the wheel, jammed or wedged behind the shoulder 18 on the tire rim, which shoulder has an internal surface that is circular. Thus, in pressing the wheel cover member home into retained position the points or portions 17 are deflected inwardly so that the edge is pressed in a direction toward its original circular condition shown in Figure 1. Hence the edge, when it is behind the shoulder 18, is stressed or, in other words, has a tendency to spring outwardly toward the buckled or distorted condition shown in Figure 2. It is this stress or resiliency which is utilized to wedge and retain the wheel cover member on the wheel.

By forming the edge into a bead it is possible to provide the cover member with a reinforced pry-off shoulder by means of which the cover member may be engaged by a pry-off tool to pry it loose from the wheel. This enables a construction which may be easily detached from the wheel when it is desired to have access to the under side thereof.

While I have in the preferred form illustrated the cover member as being in the form of a full disk, it is, of course, to be understood that it may be in the form of an annulus as shown in Figure 5. In addition, the cover member as shown in Figure 3 is stepped and curved so as to conform closely with the shape of the side flanges 11 of the rim as well as that of the convex wheel body or spider 13.

In the modification shown in Figure 5, the cover member 15' is in the form of an annulus and has its outer beaded or turned edge 16' snapped into retained engagement with an intermediate shoulder 20 of the side flanges 11 of the tire rim 10. This outer beaded edge 16' is distorted at a plurality of points in the same manner as the edge 16 of the preferred form and coacts with the shoulder 20 in the same manner as described in the preferred form of the invention.

It will be noted that in this form of the invention the inner edge of the annular cover member 15' is positioned to engage in junction of the base flange 12 with the wheel body 13 of the wheel.

It will also be observed that I utilize the rim shoulder 20 in the retaining of the wheel cover on the wheel. This shoulder or abutment is one of two provided in the rim flanges to prevent slipping or sliding of the tire beads toward the base flange of the rim. Without such shoulders there is a marked tendency of the beads sliding transversely toward the rim base flange when the tire is punctured and thereby occasioning damage to or excessive wear of the tire. Thus these shoulders are employed for a dual function in my present novel wheel construction.

I claim as my invention:

1. In a wheel structure, a wheel including a flanged and shouldered tire rim and a circular covering member formed to be resiliently snapped into retained engagement behind a shoulder of the rim, said member having an outer peripheral edge normally distorted out of a circular shape at a plurality of spaced portions and said portions being flexible upon engagement with said shoulder in a direction such as to flex said edge back to circular shape and to place said edge under resilient stress whereby it resiliently grips said rim shoulder.

2. In a wheel structure, a wheel including a flanged and shouldered tire rim and a circular covering member formed to be resiliently snapped into retained engagement behind a shoulder of the rim, said member having an outer peripheral edge normally distorted out of a circular shape at a plurality of spaced portions and said portions being flexible upon engagement with said shoulder in a direction such as to flex said edge back to circular shape and to place said edge under resilient stress whereby it resiliently grips said rim shoulder, said edge being turned back upon itself to reinforce said member and to provide a strengthened shoulder engageable by a pry-off tool.

3. In a wheel structure, a wheel including a flanged and shouldered tire rim and a circular covering member formed to be resiliently snapped into retained engagement behind a shoulder of the rim, said member having an outer peripheral edge normally distorted out of a circular shape at a plurality of spaced portions and said portions being flexible upon engagement with said shoulder in a direction such as to flex said edge back to circular shape and to place said edge under resilient stress whereby it resiliently grips said rim shoulder, said member having its outer marginal portion inside said edge stepped in shape to correspond to the flanged contour of one side of said rim.

4. In a wheel structure, a wheel including a flanged and shouldered tire rim and a circular covering member formed to be resiliently snapped into retained engagement behind a shoulder of the rim, said member having an outer peripheral edge normally distorted out of a circular shape at a plurality of spaced portions and said portions being flexible upon engagement with said shoulder in a direction such as to flex said edge back to circular shape and to place said edge under resilient stress whereby it resiliently grips said rim shoulder, said member having its outer marginal portion inside said edge stepped in shape to correspond to the flanged contour of one side of said rim, and having an axially inward convex portion shaped to conform to the contour of the outer surface of the wheel body.

GEORGE ALBERT LYON.